United States Patent
Yan

(10) Patent No.: US 10,577,434 B2
(45) Date of Patent: Mar. 3, 2020

(54) METHODS FOR PREPARATION OF FUNCTIONALIZED POLYMERS

(71) Applicant: Bridgestone Corporation, Chuo-ku (JP)

(72) Inventor: Yuan-Yong Yan, Copley, OH (US)

(73) Assignee: Bridgestone Corporation, Chuo-ku (JP)

( * ) Notice: Subject to any disclaimer, the term of this patent is extended or adjusted under 35 U.S.C. 154(b) by 131 days.

(21) Appl. No.: 15/758,504

(22) PCT Filed: Sep. 9, 2016

(86) PCT No.: PCT/IB2016/001420
§ 371 (c)(1),
(2) Date: Mar. 8, 2018

(87) PCT Pub. No.: WO2017/042631
PCT Pub. Date: Mar. 16, 2017

(65) Prior Publication Data
US 2018/0244809 A1    Aug. 30, 2018

Related U.S. Application Data

(60) Provisional application No. 62/216,827, filed on Sep. 10, 2015.

(51) Int. Cl.
*C08C 19/24* (2006.01)
*C08C 19/25* (2006.01)
*C08C 19/42* (2006.01)
*C08F 236/06* (2006.01)
*C08F 236/08* (2006.01)
*C08F 236/10* (2006.01)
*C08C 19/44* (2006.01)
*B60C 1/00* (2006.01)
*C08K 3/36* (2006.01)

(52) U.S. Cl.
CPC ............... *C08C 19/24* (2013.01); *B60C 1/00* (2013.01); *C08C 19/25* (2013.01); *C08C 19/42* (2013.01); *C08C 19/44* (2013.01); *C08F 236/06* (2013.01); *C08F 236/08* (2013.01); *C08F 236/10* (2013.01); *C08K 3/36* (2013.01)

(58) Field of Classification Search
CPC ......... C08C 19/24; C08C 19/25; C08C 19/42; C08F 236/06; C08F 236/08; C08F 236/10; B60C 1/00; C08K 3/36

USPC .......................................................... 524/547
See application file for complete search history.

(56) References Cited

U.S. PATENT DOCUMENTS

| | | |
|---|---|---|
| 4,417,029 A | 11/1983 | Milkovich |
| 7,612,144 B2 | 11/2009 | Hogan et al. |
| 8,114,921 B2 | 2/2012 | Poulton et al. |
| 8,148,486 B2 | 4/2012 | Hogan et al. |
| 8,809,440 B2 | 8/2014 | Tanaka et al. |
| 2007/0197812 A1* | 8/2007 | Chaves ................. C07F 7/1804 556/427 |
| 2012/0270997 A1* | 10/2012 | Tanaka ..................... B60C 1/00 524/572 |
| 2013/0023623 A1* | 1/2013 | Nakamura ................ B60C 1/00 524/572 |
| 2013/0085228 A1* | 4/2013 | Tanaka .................... C08C 19/25 524/572 |
| 2013/0296480 A1 | 11/2013 | Hogan et al. |
| 2013/0296481 A1* | 11/2013 | Tanaka ..................... B60C 1/00 524/575 |
| 2014/0275428 A1 | 9/2014 | Hogan et al. |

FOREIGN PATENT DOCUMENTS

| | | |
|---|---|---|
| CN | 101426809 A | 5/2009 |
| WO | 2007098121 A2 | 8/2007 |

OTHER PUBLICATIONS

Chojnowski, et al.; Synthesis of Linear Polysiloxanes with Electron-Donating Organophosphorus Pendant Groups by Kinetically Controlled Ring-Opening Polymerization; Journal of Inorganic and Organometallic Polymers, 1992, vol. 2, No. 3.

Maiti, et al.; Phosphorus-Containing Polymers, Prog. Polym. Sci. 1993, vol. 18, pp. 227-261.

The International Search Report and Written Opinion issued in corresponding International Patent Application No. PCT/IB2016/001420; dated Jan. 2, 2017.

* cited by examiner

Primary Examiner — Michael Bernshteyn
(74) Attorney, Agent, or Firm — Meredith E. Hooker; J. Gregory Chrisman

(57) ABSTRACT

Disclosed herein are phosphino- and phosphate-silane functionalized polymers, methods of preparing a reactive polymer functionalized with an alkoxysilane having a phosphorous-containing group as a functionalizing reagent, the resulting polymer and vulcanizates thereof. The vulcanizates of the functionalized polymers can be used to produce vulcanized products, including tires.

19 Claims, No Drawings

METHODS FOR PREPARATION OF FUNCTIONALIZED POLYMERS

TECHNICAL FIELD

The present disclosure relates to phosphino- and phosphate-silane functionalized polymers and methods of making the same. The disclosure also relates to the use of the functionalized polymers in producing vulcanized products, for example, tires.

BACKGROUND

In the tire industry, it is desirable to employ rubber vulcanizates that demonstrate reduced hysteresis loss, i.e., less loss of mechanical energy to heat. Functionalized polymers have been employed to reduce hysteresis loss in rubber compounds and increase bound rubber. The functional group of the functionalized polymer is believed to reduce the number of polymer free ends via interaction with filler particles. Also, this interaction may reduce filler agglomeration, which can thereby reduce hysteretic losses attributable to the disassociation of filler agglomerates.

Because functionalized polymers are advantageous, especially in the preparation of tire rubber compositions, there exists a need for additional functionalized polymers. Moreover, because precipitated silica has been increasingly used as reinforcing particulate filler in tires, functionalized elastomers having affinity to silica filler are needed.

SUMMARY

Provided herein are vulcanizates including the vulcanization product of a functionalized polymer prepared by a method including the following steps. Monomers are polymerized to form a reactive polymer. The monomers to be polymerized can include conjugated diene monomers. The reactive polymer is reacted with an alkoxysilane having a phosphorous-containing group to form a polymer including a phosphino- or phosphato-silane group. The formed polymer including a phosphino- or phosphato-silane group is added to a vulcanizable rubber composition, which can be further vulcanized to for a vulcanized product, for example, a tire. The present disclosure also includes the methods of preparing a functionalized polymer including a phosphino- or phosphato-silane group as described herein.

In one embodiment, the step of polymerizing the monomers can include the use of a coordination catalyst or an anionic initiator. For example, the reactive polymer can be an anionically-polymerized polymer.

Anionically-polymerized polymers can be prepared by polymerizing a conjugated diene monomer, optionally together with vinyl aromatic monomer, by employing an organolithium initiator. The anionically-polymerized polymer chain can be a medium- or low-cis polydiene or polydiene copolymer. For instance, the anionically-polymerized polymer chain can be selected from the group consisting of polybutadiene, polyisoprene, poly(styrene-co-butadiene), poly(styrene-co-butadiene-co-isoprene), poly(isoprene-co-styrene), and poly(butadiene-co-isoprene).

In another embodiment, the method of preparing the polymer including a phosphino- or phosphato-silane group can further include drying the polymer prior to adding the polymer to the vulcanizable rubber composition. The method of preparing the polymer can also include isolating the polymer including a phosphino- or phosphate-silane group prior to adding the polymer to the vulcanizable rubber composition.

To form the vulcanizate, the vulcanizable rubber composition can be vulcanized, for example, by applying heat to the composition or subjecting the composition to curing conditions.

In another embodiment, the method of preparing the polymer including a phosphino- or phosphato-silane group can further include quenching the polymer prior to adding the polymer to the vulcanizable rubber composition.

In yet another embodiment, the method of preparing the polymer can include the polymer not being reacted with a co-functionalizing reagent.

The method of preparing the polymer can occur in a solvent, whereupon after reaction the polymer including a phosphino- or phosphate-silane group is isolated and removed from the solvent by filtration or drying.

In one embodiment, the phosphorus-containing group of the alkoxysilane functionalizing reagent contains a P=O. The P=O group can further have an alkoxy bonded thereto.

In another embodiment, the phosphorus-containing group of the alkoxysilane functionalizing reagent can be a phosphine or protected phosphine.

In yet another embodiment, the the alkoxysilane having a phosphorous-containing group can include at least two alkoxy groups bonded to the Si of the silane.

The alkoxysilane having a phosphorous-containing group can be selected from the group consisting of 2-(diphenylphosphino)ethyltriethoxysilane, 2-(dimethylphosphino)ethyltriethoxysilane, 2-(diethylphosphino)ethyltriethoxysilane, 2-(diphenylphosphino)methyldiethoxysilane, 2-(dimethylphosphino)methyldiethoxysilane, 2-(diethylphosphino)methyldiethoxysilane, 3-(diphenylphosphino)ethyltriethoxysilane, 3-(dimethylphosphino)ethyltriethoxysilane, 3-(diethylphosphino)ethyltriethoxysilane, 3-(diphenylphosphino)methyldiethoxysilane, 3-(dimethylphosphino)methyldiethoxysilane, 3-(diethylphosphino)methyldiethoxysilane, 2-(dicyclohexylphosphinoethyl)triethoxysilane, 2-(dicyclohexylphosphinoethyl)methyldiethoxysilane, 3-(dicyclohexylphosphinoethyl)triethoxysilane, 3-(dicyclohexylphosphinoethyl)methyldiethoxysilane, (2-diethylphosphatoethyl)methyldiethoxysilane, (2-dimethylphosphatoethyl)methyldiethoxysilane, (2-diphenylphosphatoethyl)methyldiethoxysilane, (2-dicyclophosphatoethyl)methyldiethoxysilane, (3-diethylphosphatoethyl)methyldiethoxysilane, (3-dimethylphosphatoethyl)methyldiethoxysilane, (3-diphenylphosphatoethyl)methyldiethoxysilane, (3-dicyclophosphatoethyl)methyldiethoxysilane, (2-diethylphosphatoethyl)triethoxysilane, (2-dimethylphosphatoethyl)triethoxysilane, (2-diproylphosphatoethyl)triethoxysilane, (2-dicyclophosphatoethyl)triethoxysilane, (3-diethylphosphatoethyl)triethoxysilane, (3-dimethylphosphatoethyl)triethoxysilane, (3-dipropylphosphatoethyl)triethoxysilane, and (3-dicyclophosphatoethyl)triethoxysilane.

The present disclosure further includes a tire or tire component prepared by employing the vulcanizates described herein. For example, a tire can include at least one vulcanized rubber and a filler, where the at least one vulcanized rubber comprises a vulcanization product of a functionalized polymer prepared by a method including the steps of: (i) polymerizing monomers to form an anionically reactive polymer, (ii) reacting the reactive polymer with an alkoxysilane having a phosphorous-containing group to form a polymer including a phosphino- or phosphato-silane group, and (iii) adding the polymer including a phosphino- or phosphato-silane group to a vulcanizable rubber composition.

In the method of preparing the functionalized polymer for the tire, the method can include reacting the anionically reactive polymer with the an alkoxysilane having a phosphorous-containing group in a solvent, whereupon after reaction the polymer including a phosphino- or phosphate-silane group is isolated and removed from the solvent by filtration or drying.

In one embodiment, the method of preparing the functionalized polymer for the tire can include the polymer not being reacted with a co-functionalizing reagent.

In another embodiment, the alkoxysilane having a phosphorous-containing group can include a P=O group.

DETAILED DESCRIPTION

The terminology as set forth herein is for description of the embodiments only and should not be construed as limiting the invention as a whole.

Herein, when a range such as 5-25 (or 5 to 25) is given, this means preferably at least or more than 5 and, separately and independently, preferably not more than or less than 25. In an example, such a range defines independently at least 5, and separately and independently, not more than 25.

As used herein, the term "phr" means the parts by weight of rubber. If the rubber composition comprises more than one rubber, "phr" means the parts by weight per hundred parts of the sum of all rubbers.

For the purpose of this disclosure, any reference to a percent amount of a component in the rubber composition means a percent by weight, unless otherwise specified. Similarly, any reference to ratios of component amounts in the rubber composition means the ratios by weight, unless otherwise specified. Unless stated to the contrary, discussions herein relating to the components and amounts of the rubber compositions of the present disclosure should be understood to apply equally to the other embodiments, e.g., the related methods and the tires (and tire treads) containing the rubber compositions disclosed herein.

One or more embodiments of the present disclosure are directed toward further enhancing the functionality of phosphine- and phosphate-silane functionalized polymers by reacting or treating them with an alkoxysilane having a phosphorous-containing group. The resulting functionalized polymers of one or more embodiments are useful for forming filled vulcanizates that demonstrate advantageously low hysteresis loss, and therefore the polymers are particularly useful for preparing tires and components thereof.

The resulting functionalized polymer of one or more embodiments of this disclosure can be represented by the formula

$\pi$ includes a polymer chain substituent, $R^1$ is independently a hydrogen, monovalent organic group, alkyl or alkoxy group, $R^2$ is independently a hydrogen, monovalent organic group, alkyl or alkoxy group, n is 1 to 12, $R^3$ is independently a monovalent organic group, divalent organic group, =O, alkyl, alkene, or alkoxy, $R^4$ is independently a monovalent organic group, divalent organic group, =O, alkyl, alkene, or alkoxy, $R^5$ is independently a monovalent organic group, divalent organic group, =O, alkyl, alkene, or alkoxy and P is phosphorus, wherein only one of $R^3$, $R^4$ and $R^5$ can be =O for any given functionalized polymer. For instance, if $R^3$ represents =O, then $R^4$ and $R^5$ cannot represent = in the formula for the functionalized polymer.

In one or more embodiments, monovalent organic groups may include hydrocarbyl groups or substituted hydrocarbyl groups such as, but not limited to alkyl, cycloalkyl, substituted cycloalkyl, alkenyl, cycloalkenyl, substituted cycloalkenyl, alkane, cycloalkane (e.g., cyclohexane), substituted cycloalkane, aryl, allyl, substituted aryl, aralkyl, alkaryl, and alkynyl groups, with each group preferably containing from 1 carbon atom, or the appropriate minimum number of carbon atoms to form the group, up to 20 carbon atoms. These hydrocarbyl groups may contain heteroatoms such as, but not limited to, nitrogen, boron, oxygen, silicon, sulfur, and phosphorus atoms. In one or more embodiments, monovalent organic groups will not react with a living polymer. Particular groups include phenyl, benzyl, cyclohexane, and ethoxy.

In one or more embodiments, the divalent organic group may include a hydrocarbylene group or substituted hydrocarbylene group such as, but not limited to, alkylene, cycloalkylene, substituted alkylene, substituted cycloalkylene, alkenylene, cycloalkenylene, substituted alkenylene, substituted cycloalkenylene, arylene, and substituted arylene groups, with each group preferably containing from 1 carbon atom, or the appropriate minimum number of carbon atoms to form the group, up to about 20 carbon atoms. Substituted hydrocarbylene group includes a hydrocarbylene group in which one or more hydrogen atoms have been replaced by a substituent such as an alkyl group. The divalent organic groups may also contain one or more heteroatoms such as, but not limited to, nitrogen, oxygen, boron, silicon, sulfur, and phosphorus atoms. In one or more embodiments, the divalent organic group will not react with a living anionic polymer.

In one or more embodiments, the functionalized polymer can include only one Si atom as provided by the functionalizing agent being reacted with a reactive polymer. In one or more embodiments, the functionalized polymer can include only one P atom as provided by the functionalizing agent being reacted with a reactive polymer.

In one or more embodiments, functionalities or functional groups, for example the phosphine- or phosphato-silane groups, that have a desirable impact on filled rubber compositions or vulcanizates include those groups or substituents that react or interact with rubber or fillers (e.g., silica) employed in rubber compositions. In one or more embodiments, functional groups include those substituents that reduce tan delta ($\delta$) and hysteresis of a silica-filled vulcanizate as compared to similar silica-filled vulcanizates without the functional group. An art recognized measurement of the hysteresis of an elastomer composition is the tan delta value of the vulcanized composition. Low tan delta values at 50° to 65° C., are indicative of low hysteresis and, consequently, tires formed from such elastomer compositions have lower rolling resistance. In one or more embodiments, this reduction in tan $\delta$ is at least 40 to 45%, in other embodiments at least 45 to 50%, and in other embodiments at least 50 to 55 or 55 to 60%. In other embodiments, functional groups include those groups that will have a similar impact on carbon black-filled or mixed carbon black/silica-filled compositions.

In one or more embodiments, the polymer chain $\pi$ is an elastomer, which refers to a polymer chain that is capable of being vulcanized into a vulcanizate exhibiting elastomeric properties.

In one or more embodiments, the polymer chain $\pi$ is a homopolymer, and in other embodiments the polymer chain π is a copolymer, which refers to a polymer having two or more chemically distinct mer units. In one or more embodiments, the mer units of the polymer may be cis, trans, or vinyl.

In one or more embodiments, the polymer chain may include rubber polymers, which include those polymers that are capable of being vulcanized. Types of rubber polymers include those synthesized from conjugated diene monomer optionally in combination with copolymerizable monomer such as vinyl aromatic monomer; these polymers may be referred to as polydienyl polymers or polydienyl copolymers. In one or more embodiments, the polymer chain includes polymers prepared by anionic polymerization. Examples of these polymers include polybutadiene, polyisoprene, poly(styrene-co-butadiene), poly(styrene-co-butadiene-co-isoprene), poly(isoprene-co-styrene), and poly(butadiene-co-isoprene).

Practice of one or more embodiments of the present disclosure is not limited by the polymer chain π. In certain embodiments, the polymer chain is saturated, and in other embodiments the polymer chain is unsaturated. In certain embodiments, the polymer chain is a thermoplastic polymer, and in other embodiments, the polymer chain is amorphous or only slightly crystalline. In one embodiment, the polymer chain includes a polymer that has a glass transition temperature (Tg) of less than 0° C., in other embodiments less than −20° C., and in other embodiments less than −30° C. In one or more embodiments, the rubber polymer chain exhibits a single glass transition temperature.

In one or more embodiments, the polymer chain may be characterized by a number average molecular weight ($M_n$) of from about 5 to about 1,000 kg/mole, in other embodiments from about 50 to about 500 kg/mole, and in other embodiments 100 to about 300 kg/mole, as measured by using Gel Permeation Chromatography (GPC). In one or more embodiments, the polymer chain may by characterized by a molecular weight distribution that is less than 4, in other embodiments less than 2.5, and in other embodiments less than 1.8; in these or other embodiments, the polymer chain may be characterized by a molecular weight distribution greater than 1. As those skilled in the art will appreciate, certain functionalized polymers may be coupled, which will increase molecular weight distribution as measured by GPC.

In one or more embodiments, the reactive polymer can be prepared by any polymerization methods known in the art. Various types of monomer, catalyst, and solvent can be employed as ingredients for preparing the active polymerization mixture. The practice of one or more embodiments of the present disclosure is not limited by the selection of any particular polymerization method or any particular types of ingredients used to prepare the polymerization mixture. Reactive polymers may include those initiated by an anionic initiator or a coordination catalyst. In these or other embodiments, the propagating polymeric species may be referred to as a living or pseudo-living polymer, or simply as a reactive polymer.

In one or more embodiments, the reactive polymer bearing a carbon anion may include a living polymer. Living polymers include polymers prepared by anionic polymerization techniques, which include a carbon anion at their reactive end. These polymers may be formed by reacting anionic initiators with certain unsaturated monomers to propagate a polymeric structure. Throughout formation or propagation of the polymer, the polymeric structure may be anionic and "living." In other words, a carbon anion is present. A new batch of monomer subsequently added to the reaction can add to the living ends of the existing chains and increase the degree of polymerization. A living polymer, therefore, may include a polymeric segment having an anionic, reactive end. Anionic polymerization is further described in George Odian, Principles of Polymerization, chapter 5 ($3^{rd}$ Ed. 1991), or Panek, 94 J. Am. Chem. Soc., 8768 (1972), which are incorporated herein by reference. Reference to anionically polymerized polymers or anionically polymerized living polymers refer to those polymers prepared by anionic polymerization techniques.

Monomers that can be employed in preparing an anionically polymerized living polymer include any monomer capable of being polymerized according to anionic polymerization techniques. These monomers include those that lead to the formation of elastomeric homopolymers or copolymers. Suitable monomers include, without limitation, conjugated $C_4$-$C_{12}$ dienes, $C_8$-$C_{18}$ monovinyl aromatic monomers, and $C_6$-$C_{20}$ trienes. Examples of conjugated diene monomers include, without limitation, 1,3-butadiene, isoprene, 1,3-pentadiene, 2,3-dimethyl-1,3-butadiene, and 1,3-hexadiene. A non-limiting example of trienes includes myrcene. Aromatic vinyl monomers include, without limitation, styrene, α-methyl styrene, p-methylstyrene, and vinylnaphthalene. When preparing elastomeric copolymers, such as those containing conjugated diene monomers and aromatic vinyl monomers, the conjugated diene monomers and aromatic vinyl monomers can be used at a ratio of 95:5 to 50:50, and preferably 95:5 to 60:40.

One type of living polymer is a copolymer of styrene and 1,3-butadiene (SBR). In one or more embodiments, the styrene content of the SBR copolymer is from about 10 to about 50 percent by weight of the total polymer, and in other embodiments, from about 12 to about 40 percent by weight of the total polymer. In one or more embodiments, from about 8 to about 99 percent of the units derived from the 1,3-butadiene may be the 1,2-vinyl microstructure, in another embodiment from about 10 to about 60 percent of the units derived from the 1,3-butadiene are of the 1,2-vinyl microstructure. The remaining units derived from the 1,3-butadiene may be in the 1,4-cis- or 1,4-trans-microstructure at a relative ratio of about 3 cis-units to 5 trans-units.

Any anionic initiator can be employed to initiate the formation and propagation of the living polymers. Exemplary anionic initiators include, but are not limited to, alkyl lithium initiators such as n-butyl lithium, arenyllithium initiators, arenylsodium initiators, N-lithium dihydro-carbon amides, aminoalkyllithiums, and alkyl tin lithiums. Other useful initiators include N-lithiohexamethyleneimide, N-lithiopyrrolidinide, and N-lithiododecamethyleneimide as well as organolithium compounds such as the tri-alkyl lithium adducts of substituted aldimines and substituted ketimines, and N-lithio salts of substituted secondary amines. Exemplary initiators are also described in the following U.S. Pat. Nos. 5,332,810, 5,329,005, 5,578,542, 5,393,721, 5,698,646, 5,491,230, 5,521,309, 5,496,940, 5,574,109, 5,786,441, and International Publication No. WO 2004/020475, which are incorporated herein by reference. In one or more embodiments, the initiator employed advantageously imparts a functional group at the head of the polymer chain. The functional group may react or interact with rubber or rubber fillers or otherwise have a desirable impact on filled rubber compositions or vulcanizates including those described above.

The amount of initiator employed in conducting anionic polymerizations can vary based upon the desired polymer characteristics. In one embodiment, from about 0.1 to about 100, and in other embodiments from about 0.11 to about 10 mmol of lithium per 100 g of monomer is employed.

Anionic polymerizations may be conducted in a polar solvent such as tetrahydrofuran (THF), or in a nonpolar hydrocarbon such as the various cyclic and acyclic hexanes, heptanes, octanes, pentanes, their alkylated derivatives, and mixtures thereof, as well as benzene.

In order to promote randomization in copolymerization and/or to control vinyl content, a polar coordinator may be added to the polymerization ingredients. These randomizers may be used in amounts between 0 and 90 or more equivalents per equivalent of lithium. The amount may depend on the amount of vinyl desired, the level of styrene employed and the temperature of the polymerization, as well as the nature of the specific polar coordinator (modifier) employed. Suitable polymerization modifiers include, for example, ethers or amines to provide the desired microstructure and randomization of the comonomer units.

Compounds useful as polar coordinators include those having an oxygen or nitrogen heteroatom and a non-bonded pair of electrons. Examples include dialkyl ethers of mono and oligo alkylene glycols; "crown" ethers; tertiary amines such as tetramethylethylene diamine (TMEDA); linear THF oligomers; and the like. Specific examples of compounds useful as polar coordinators include tetrahydrofuran (THF), linear and cyclic oligomeric oxolanyl alkanes such as 2,2-bis(2'-tetrahydrofuryl) propane, di-piperidyl ethane, dipiperidyl methane, hexamethylphosphoramide, N—N'-dimethylpiperazine, diazabicyclooctane, dimethyl ether, diethyl ether, tributylamine and the like. Linear and cyclic oligomeric oxolanyl alkane modifiers are described in U.S. Pat. No. 4,429,091, which is incorporated herein by reference.

In other embodiments, a coordination catalyst may be employed. Coordination catalysts can be one-, two-, three- or multi-component systems. In one or more embodiments, a coordination catalyst may be formed by combining a heavy metal compound (e.g., a transition metal compound or a lanthanide compound), an alkylating agent (e.g., an organoaluminum compound), and optionally other co-catalyst components.

Various procedures can be used to prepare coordination catalysts. In one or more embodiments, a coordination catalyst may be formed in situ by separately adding the catalyst components to the monomer to be polymerized in either a stepwise or simultaneous manner. In other embodiments, a coordination catalyst may be performed. That is, the catalyst components are pre-mixed outside the polymerization system either in the absence of any monomer or in the presence of a small amount of monomer. The resulting preformed catalyst composition may be aged, if desired, and then added to the monomer that is to be polymerized.

Anionically polymerized living polymers can be prepared by either batch or continuous methods. A batch polymerization may be begun by charging a blend of monomer(s) and normal alkane solvent to a suitable reaction vessel, followed by the addition of the polar coordinator (if employed) and an initiator compound. The reactants can be heated to a temperature of from about 20 to about 130° C. and the polymerization may be allowed to proceed for from about 0.1 to about 24 hours. This reaction can produce a reactive polymer having a reactive or living end. In one or more embodiments, at least about 30% of the polymer molecules contain a living end, in other embodiments at least about 50% of the polymer molecules contain a living end, and in other embodiments at least about 80% contain a living end.

In one or more embodiments, the formation of the reactive polymer, and the functionalized polymer which bears a phosphine or phosphate group, may occur in solution at standard conditions. In one or more embodiments, the solution may be under an inert atmosphere. In one or more embodiments, the solution in which the reactive polymer may be formed may include a solvent. Useful solvents may include those solvents in which the reactive polymer and the alkoxysilane having a phosphorous-containing group and/or the reactants giving rise to these polymers are at least partially soluble. Exemplary solvents include polar solvents such as tetrahydroftran (THF) or non-polar hydrocarbons solvents such as cyclic and acyclic hexanes, heptanes, octanes, pentanes, their alkylated derivatives, and mixtures thereof. Other non-polar hydrocarbon solvents that may be used include aromatic solvents such as benzene.

In one or more embodiments, the reaction leading to the formation of the polymer bearing a phosphine- or phosphate-silane group may occur at temperatures from about −50° C. to about 150° C., and in other embodiments from about 0° C. to about 100° C. In one or more embodiments, the reaction medium may be maintained under an inert atmosphere, for example, a nitrogen or argon atmosphere.

A continuous polymerization may be begun by charging monomer(s), initiator or catalyst and solvent at the same time to a suitable reaction vessel. Thereafter, a continuous procedure may be followed that removes product after a suitable residence time and replenishes the reactants.

In one embodiment, the reaction to produce phosphine- or phosphate-silane functionalized polymer can be achieved by simply mixing the alkoxysilane functionalizing agent having a phosphorous-containing group with the reactive polymer. In certain embodiments, the functionalizing agent is added once a peak polymerization temperature, which is indicative of nearly complete monomer conversion, is observed. Because reactive ends may self-terminate, in one or more embodiments the functionalizing agent may be added within about 25 to 35 minutes of the peak polymerization temperature.

The reactive polymer is typically contacted with the alkoxysilane functionalizing agent in a solvent. In one or more embodiments, the solvent is one in which both the polymer and functionalizing agent are soluble. In one embodiment, the reaction can occur in the same medium in which the polymerization occurred.

During formation of the functionalized polymer, the alkoxysilane functionalizing agent having a phosphorous-containing group can be the only functionalizing agent reacting with the reactive polymer such that no other co-functionalizing agent is present, either before or after the addition of the alkoxysilane functionalizing agent having a phosphorous-containing group. As further disclosed below, the formed functionalized polymer including a phosphine- or phosphate-silane group is separated or isolated for inclusion in a vulcanizable rubber composition.

The alkoxysilane functionalizing agent having a phosphorous-containing group for reacting with the reactive polymer of one or more embodiments of this disclosure can be represented by the formula

$R^1$, $R^2$ and $R^3$ are each independently a hydrogen, monovalent organic group, alkyl or alkoxy group, n is 1 to 12, and $R^4$, $R^5$, $R^6$ are each independently a monovalent organic group, divalent organic group, =O, alkyl, alkene, or alkoxy. The monovalent organic group and divalent organic group for substituents $R^1$, $R^2$, $R^3$, $R^4$, $R^5$ and $R^6$ can be as described above with regard to the phosphine- and phosphate-silane functionalized polymers. Notably, as described above with regard to $R^3$, $R^4$ and $R^5$, only one of $R^3$, $R^4$ and $R^5$ can be =O for any given functionalized polymer. For instance, if $R^3$ represents =O, then $R^4$ and $R^5$ cannot represent = in the formula for the functionalized polymer.

In one or more embodiments, $R^1$, $R^2$ and $R^3$ can be a monovalent group that includes a functionality that can react with (e.g. undergo a substitution or addition reaction) with a pseudo-living polymer (e.g. a polymer prepared with a lanthanide-based catalyst system). Examples of functionalities that react with a pseudo-living polymer include those disclosed in U.S. Patent Application Publication No. 2008/0182954, which is incorporated by reference herein. Specific examples include ketone, aldehyde, amide, ester, imidazolidinone, isocyanate, isothiocyanate, epoxide, imine, amino ketone, and acid anhydride groups.

In one or more embodiments, the $PR^4R^5R^6$ group of the alkoxysilane functionalizing agent contains a P=O. The phosphorus atom of the group can further include a bonded alkoxy, for example, one or more of a methoxy, ethoxy group or a combination thereof. The alkoxy group can also be selected from a $C_1$-$C_{12}$ straight-chain or branched alkoxy group.

In another embodiment, one or more alkoxy groups can be bonded to the Si atom, for example, 2 or 3 alkoxy groups, for example, a $C_1$-$C_{12}$ straight-chain or branched alkoxy group. In a preferred embodiment, the alkoxy groups can be methoxy or ethoxy groups, or a combination thereof.

Other examples of alkoxysilane functionalizing agents having a phosphorous-containing group can include, but are not limited to, 2-(diphenylphosphino)ethyltriethoxysilane, 2-(dimethylphosphino)ethyltriethoxysilane, 2-(diethylphosphino)ethyltriethoxysilane, 2-(diphenylphosphino)methyldiethoxysilane, 2-(dimethylphosphino)methyldiethoxysilane, 2-(diethylphosphino)methyldiethoxysilane, 3-(diphenylphosphino)ethyltriethoxysilane, 3-(dimethylphosphino)ethyltriethoxysilane, 3-(diethylphosphino)ethyltriethoxysilane, 3-(diphenylphosphino)methyldiethoxysilane, 3-(dimethylphosphino)methyldiethoxysilane, 3-(diethylphosphino)methyldiethoxysilane, 2-(dicyclohexylphosphinoethyl)triethoxysilane, 2-(dicyclohexylphosphinoethyl)methyldiethoxysilane, 3-(dicyclohexylphosphinoethyl)triethoxysilane, 3-(dicyclohexylphosphinoethyl)methyldiethoxysilane, (2-diethylphosphatoethyl)methyldiethoxysilane, (2-dimethylphosphatoethyl)methyldiethoxysilane, (2-diphenylphosphatoethyl)methyldiethoxysilane, (2-dicyclophosphatoethyl)methyldiethoxysilane, (3-diethylphosphatoethyl)methyldiethoxysilane, (3-dimethylphosphatoethyl)methyldiethoxysilane, (3-diphenylphosphatoethyl)methyldiethoxysilane, (3-dicyclophosphatoethyl)methyldiethoxysilane, (2-diethylphosphatoethyl)triethoxysilane, (2-dimethylphosphatoethyl)triethoxysilane, (2-diproylphosphatoethyl)triethoxysilane, (2-dicyclophosphatoethyl)triethoxysilane, (3-diethylphosphatoethyl)triethoxysilane, (3-dimethylphosphatoethyl)triethoxysilane, (3-dipropylphosphatoethyl)triethoxysilane, and (3-dicyclophosphatoethyl)triethoxysilane.

The amount of alkoxysilane functionalizing agent that can be reacted with the reactive polymer may depend on various factors including the type and amount of catalyst or initiator used to initiate the polymerization and the desired degree of functionalization. In one or more embodiments, where the reactive polymer is prepared by employing a lanthanide-based catalyst, the amount of the alkoxysilane functionalizing agent employed can be described with reference to the lanthanide metal of the lanthanide compound. For example, the molar ratio of the alkoxysilane functionalizing agent to the lanthanide metal may be from about 1:1 to about 200:1, in other embodiments from about 5:1 to about 150:1, and in other embodiments from about 10:1 to about 100:1.

In other embodiments, such as where the reactive polymer is prepared by using an anionic initiator, the amount of the alkoxysilane functionalizing agent employed can be described with reference to the amount of metal cation associated with the initiator. For example, where an organolithium initiator is employed, the molar ratio of the alkoxysilane functionalizing agent to the lithium metal may be from about 0.3:1 to about 1.1:1, in other embodiments from about 0.4:1 to about 1:1, and in other embodiments from 0.5:1 to about 0.9:1. It will be appreciated that these numbers are based upon the amount of initiator added to the system, and may or may not reflect the amount of initiator that is associated with the polymer.

In one embodiment, at least about 30 percent of the polymer molecules are functionalized with the alkoxysilane functionalizing agent. In a further embodiment, at least about 50 percent of the polymer molecules are functionalized with the alkoxysilane functionalizing agent.

It will be understood that the functionalization process of the present disclosure may result in a mixture of polymer molecules, including alkoxy-functionalized polymer molecules including a phosphine- or phosphate-group, and polymer molecules that are not functionalized by the alkoxysilane having a phosphorous-containing group. The relative amounts of each of these types of polymer molecules can be adjusted to desired levels by, for example, adjusting the amounts of alkoxysilane and/or amino alcohol used relative to polymer, and reaction conditions.

After formation of the functionalized polymer, a processing aid and/or other optional additives such as oil can be added to the polymer cement. For example, an antioxidant can be added. The functionalized polymer and other optional ingredients can then be isolated from the solvent and dried. Conventional procedures for desolventization and drying may be employed. In one embodiment, the functionalized polymer may be isolated from the solvent by steam desolventization or hot water coagulation of the solvent followed by filtration. Residual solvent may be removed by using conventional drying techniques such as oven drying or drum drying. Alternatively, the cement may be directly steam desolventized.

The functionalized polymers of this disclosure are useful in preparing tire components. These tire components can be prepared by using the functionalized polymers of this disclosure alone or together with other rubbery polymers. Other rubbery polymers that may be used include natural and synthetic elastomers. The synthetic elastomers typically derive from the polymerization of conjugated diene monomers. These conjugated diene monomers may be copolymerized with other monomers such as vinyl aromatic monomers. Other rubbery elastomers may derive from the polymerization of ethylene together with one or more α-olefins and optionally one or more diene monomers.

Useful rubbery elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Other ingredients that are typically employed in rubber compounding may also be added.

The rubber compositions may include fillers such as inorganic and organic fillers. The organic fillers include carbon black and starch. The inorganic fillers may include silica, aluminum hydroxide, magnesium hydroxide, clays (hydrated aluminum silicates), and mixtures thereof.

A multitude of rubber curing agents may be employed, including sulfur or peroxide-based curing systems. Curing agents are described in Kirk-Othmer, ENCYCLOPEDIA OF CHEMICAL TECHNOLOGY, Vol. 20, pgs. 365-468, ($3^{rd}$ Ed. 1982), particularly Vulcanization Agents and Auxiliary Materials, pgs. 390-402, and A. Y. Coran, Vulcanization, ENCYCLOPEDIA OF POLYMER SCIENCE AND ENGINEERING, ($2^{nd}$ Ed. 1989), which are incorporated herein by reference. Vulcanizing agents may be used alone or in combination.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

These rubber compositions may be useful for forming tire components such as treads, subtreads, black sidewalls, body ply skins, bead filler, and the like. In one or more embodiments, the functional polymers of this disclosure are employed in tread formulations, and these tread formulations may include from about 10 to about 100% by weight of the functionalized polymer based on the total rubber within the formulation, in other embodiments, the tread formulation may include from about 35 to about 90% by weight, and in other embodiments from about 50 to 80% by weight of the functional polymer based on the total weight of the rubber within the formulation. The preparation of vulcanizable compositions and the construction and curing of the tire may not be affected by the practice of this disclosure.

The vulcanizable rubber composition can be prepared by forming an initial masterbatch that includes the rubber component and filler. This initial masterbatch can be mixed at a starting temperature of from about 25° C. to about 125° C. with a discharge temperature of about 135° C. to about 180° C. To prevent premature vulcanization also known as scorch, this initial masterbatch may exclude any vulcanizing agents. Once the initial masterbatch is processed, the vulcanizing agents can be introduced and blended into the initial masterbatch at low temperatures in a final mix stage, which may not initiate the vulcanization process. Optionally, additional mixing stages, sometimes called re-mills, can be employed between the masterbatch mix stage and the final mix stage. Rubber compounding techniques and the additives employed therein are generally known as disclosed in The Compounding and Vulcanization of Rubber, in Rubber Technology ($2^{nd}$ Ed. 1973). The mixing conditions and procedures applicable to silica-filled tire formulations are also well known as described in U.S. Pat. Nos. 5,227,425, 5,719,207, 5,717,022, and European Pat. No. 890,606, all of which are incorporated herein by reference.

Where the vulcanizable rubber compositions are employed in the manufacture of tires, these compositions can be processed into tire components according to ordinary tire manufacturing techniques including standard rubber shaping, molding and curing techniques. Typically, vulcanization can be effected by heating the vulcanizable composition in a mold; e.g., it is heated to about 140 to about 180° C. Cured or crosslinked rubber compositions may be referred to as vulcanizates, which generally contain three-dimensional polymeric networks that are thermoset. In one or more embodiments, the vulcanizate includes a vulcanized residue or vulcanization product of the functionalized polymer. The other ingredients, such as processing aides and fillers, may be evenly dispersed throughout the vulcanized network. Pneumatic tires can be made as discussed in U.S. Pat. Nos. 5,866,171, 5,876,527, 5,931,211, and 5,971,046, which are incorporated herein by reference.

In certain embodiments, the functionalized polymers of this disclosure provide carbon black, carbon black/silica, and silica filled-rubber vulcanizates with an advantageous balance of properties. Exemplary vulcanizates exhibit reduced hysteresis loss. Polymer processability, as indicated by Mooney viscosity, can also be maintained. These functionalized polymers can be readily prepared by terminating living polymers.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. More specifically, the particular rubbers, fillers, and other ingredients (e.g., antioxidant, curative, etc.) utilized in the examples should not be interpreted as limiting since other such ingredients consistent with the disclosure in the Detailed Description can utilized in substitution. That is, the particular ingredients in the compositions, as well as their respective amounts and relative amounts should be understood to apply to the more general content of the Detailed Description.

Example 1

A 2-gallon reactor equipped with a stirrer was purged with $N_2$. To the reactor was added 1.492 kg of hexane, 0.454 kg of 33.0 wt % styrene in hexane, and 2.994 kg of 20.0 wt % butadiene in hexane. To the reactor was charged 4.0 ml of 1.6M butyl lithium in hexane and 1.25 ml of 1.6M 2,2'-di(tetrahydrofuryl)propane in hexane and the batch temperature was increased to 50° C. After 35 minutes, the batch temperature peaked at 65° C. The batch was maintained above 50° C. for an additional 30 minutes. The resulting cement was discharged into nitrogen purged bottles.

Example 2

A bottle of cement was transferred from the 2-gallon reactor used in Example 1 and to this was added 1 equivalent of isopropanol. The contents were held at 50° C. for 30 minutes and the polymer cement was dropped into isopropanol containing butylated hydroxytoluene (BHT) and drum dried. The isolated polymer had the following properties: $M_n$ (g/mole)=107828, $M_w$ (g/mole)=113197, $M_p$ (g/mole)=110785, MWD=1.05, % coupling=1.4 and $T_g$ (° C.)=−40.50. This polymer is designated SBR.

Example 3

A bottle of cement was transferred from the 2-gallon reactor used in Example 1 and to this was added 1 equivalent of triethoxy(octyl)silane (OTEOS). The contents were held at 50° C. for 30 minutes and the polymer cement was dropped into isopropanol containing butylated hydroxytoluene (BHT) and drum dried. The isolated polymer had the following properties: $M_n$ (g/mole)=122471, $M_w$ (g/mole)=138938, $M_p$ (g/mole)=112341, MWD (polydiversity Index)=1.13, % coupling=22.23 and $T_g$ (° C.)=−39.76. This polymer is designated SBR-triethoxy(octyl)silane.

Example 4

A 2-gallon reactor equipped with a stirrer was purged with $N_2$. To the reactor was added 1.492 kg of hexane, 0.454 kg of 33.0 wt % styrene in hexane, and 2.994 kg of 20.0 wt % butadiene in hexane. To the reactor was charged 4.0 ml of 1.6M butyl lithium in hexane and 1.25 ml of 1.6M 2,2'-di(tetrahydrofuryl)propane in hexane and the batch temperature was increased to 50° C. After 34 minutes, the batch temperature peaked at 66° C. The batch was maintained above 50° C. for an additional 30 minutes. The resulting cement was discharged into nitrogen purged bottles.

Example 5

A bottle of cement was transferred from the 2-gallon reactor used in Example 4 and to this was added 1 equivalent of 1.0M hexamethylcyclotrisiloxane in hexane. The contents were held at 50° C. for 30 minutes and the polymer cement was dropped into isopropanol containing butylated hydroxytoluene (BHT) and drum dried. The isolated polymer had the following properties: $M_n$ (g/mole)=110396, $M_w$ (g/mole)=115613, $M_p$ (g/mole)=114716, MWD=1.05, % coupling=0 and $T_g$ (° C.)=−39.79. This polymer is designated SBR-hexamethylcyclotrisiloxane.

Example 6

A bottle of cement was transferred from the 2-gallon reactor used in Example 4 and to this was added 1 equivalent of 2.78M 2-(diphenylphosphino)ethyltriethoxy-silane in hexane. The contents were held at 50° C. for 30 minutes and the polymer cement was dropped into isopropanol containing butylated hydroxytoluene (BHT) and drum dried. The isolated polymer had the following properties: $M_n$ (g/mole)=132293, $M_w$ (g/mole)=153443, $M_p$ (g/mole)=115519, MWD=1.16, % coupling=31.45 and $T_g$ (° C.)=−40.51. This polymer is designated SBR-(diphenylphosphino)ethyltriethoxy-silane.

Example 7

A bottle of cement was transferred from the 2-gallon reactor used in Example 4 and to this was added 1 equivalent of 2.52M (2-dicyclohexylphosphinoethyl)triethoxysilane in hexane. The contents were held at 50° C. for 30 minutes and the polymer cement was dropped into isopropanol containing butylated hydroxytoluene (BHT) and drum dried. The isolated polymer had the following properties: $M_n$ (g/mole)=139923, $M_w$ (g/mole)=176815, $M_p$ (g/mole)=115519, MWD=1.26, % coupling=35.32 and $T_g$ (° C.)=−40.09. This polymer is designated SBR-(2-dicyclohexylphosphinoethyl)triethoxysilane.

Example 8

A bottle of cement was transferred from the 2-gallon reactor used in Example 4 and to this was added 1 equivalent of 3.14M (2-diethylphosphatoethyl)triethoxy-silane in hexane. The contents were held at 50° C. for 30 minutes and the polymer cement was dropped into isopropanol containing butylated hydroxytoluene (BHT) and drum dried. The isolated polymer had the following properties: $M_n$ (g/mole)=151779, $M_w$ (g/mole)=203512, $M_p$ (g/mole)=226673, MWD=1.34, % coupling=60.68 and $T_g$ (° C.)=−39.66. This polymer is designated SBR-(2-diethylphosphatoethyl)triethoxy-silane.

The polymers prepared in Examples 2-3 and 5-8, were used to prepare vulcanized elastomer, rubber compositions, wherein the six compositions contained silica as the filler. The tire formulations were mixed using conventional mixing procedures. The formulations of the silica compositions are shown below in Table 1.

TABLE 1

| Masterbatch | Amount (phr) |
|---|---|
| Polymer | 80 |
| Silica | 52.5 |
| NR | 20 |
| Wax | 2 |
| Black oil | 10 |
| Stearic acid | 2 |
| N-phenyl-N'-(1,3-dimethylbutyl)-p-phenylenediamine (6PPD) | 0.95 |
| N-stage sub. | 167.45 |
| Re-mill | |
| N-stage | 167.45 |
| Silica | 2.5 |
| Silane | 5 |
| G-stage sub. | 174.95 |
| Final | |
| G-stage | 174.95 |
| Sulfur | 1.5 |
| N-t-butylbenzothiazole-2-sulfenamide (TBBS) | 0.7 |
| 2,2'-dithiobisbenzothiazole (MBTS) | 2 |
| N,N'-diphenylguanidine (DPG) | 1.4 |
| ZnO | 2.5 |
| Final total | 183.05 |

Each rubber composition (vulcanized) was evaluated and measured for strain, tan δ (60° C.), Mooney viscosity (ML 1+4, 130° C.), and % bound rubber. The results are shown in Table 2 below. The results are indexed based on the results for SBR that is not functionalized. The results for SBR are given a base value of 100 and the results for the remaining rubber compositions are indexed based on the 100 value for SBR.

TABLE 2

| Functionalized Polymer | Indexed ML (1 + 4) @ 130° C. (% increase or decrease from SBR) | Indexed tan δ 60° C. (% increase or decrease from SBR) | Indexed Bound Rubber (%) (% increase or decrease from SBR) |
|---|---|---|---|
| SBR | 100 | 100 | 100 |
| SBR-triethoxy(octyl)silane | 155.1 (55.1%) | 85.0 (−15%) | 229.5 (129.5%) |
| SBR-hexamethylcyclotrisiloxane | 242.9 (142.9%) | 47.4 (−52.6%) | 481.4 (381.4%) |
| SBR-(diphenylphosphino)ethyltriethoxy-silane | 279.3 (179.3%) | 44.4 (−55.6%) | 468.8 (368.8%) |
| SBR-(2-dicyclohexylphosphinoethyl)triethoxysilane | 264.5 (164.5%) | 50.1 (−49.9%) | 388.5 (288.5%) |

TABLE 2-continued

| Functionalized Polymer | Indexed ML (1 + 4) @ 130° C. (% increase or decrease from SBR) | Indexed tan δ 60° C. (% increase or decrease from SBR) | Indexed Bound Rubber (%) (% increase or decrease from SBR) |
|---|---|---|---|
| SBR-(2-diethylphosphatoethyl)triethoxy-silane | 260.1 (160.1%) | 49.9 (−50.1%) | 412.8 (312.8%) |

As can be seen in Table 2, the compounds containing the polymers functionalized with phosphine- and phosphato-silane groups had lower tan δ at 60° C. values as compared to compounds with SBR and SBR-triethoxy(octyl)silane, which is a predictor for better rolling resistance. For example, the compounds containing the polymers functionalized with phosphine- and phosphato-silane groups can result in a reduction in tan δ at 60° C. of at least 40%, 45%, 48%, 49%, 50%, 55% and up to 60% and more as compared to SBR.

As further seen in Table 2, functional polymers made with the alkoxysilanes having a phosphorous-containing group of the present disclosure had a measured reduction in Mooney viscosity (ML 1+4, 130° C.) as compared to compounds with SBR and SBR-triethoxy(octyl)silane. As compared to the SBR compound, the functional polymers can have an increase in Mooney viscosity of at least 140%, 150%, 155%, 160%, 165%, 170%, 175% and up to 180% or more.

This application discloses several numerical range limitations that support any range within the disclosed numerical ranges, even though a precise range limitation is not stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A vulcanizable rubber composition comprising a functionalized polymer, the functionalized polymer prepared by a method comprising the steps of:
   (i) polymerizing monomers to form a reactive polymer, wherein the monomers include conjugated diene monomers,
   (ii) reacting the reactive polymer with an alkoxysilane having a phosphorous-containing group to form a polymer including
      (a) a phosphino-silane group, wherein the alkoxysilane is selected from a group consisting of 2-(dicyclohexylphosphinoethyl)triethoxysilane, 2-(dicyclohexylphosphinoethyl)methyldiethoxysilane, 3-(dicyclohexylphosphinoethyl)triethoxysilane, and 3-(dicyclohexylphosphinoethyl)methyldiethoxysilane, or
      (b) a phosphato-silane group, and
   (iii) adding the polymer including a phosphino- or phosphato-silane group to the vulcanizable rubber composition.

2. The vulcanizable rubber composition of claim 1, where said step of polymerizing employs a coordination catalyst or an anionic initiator.

3. The vulcanizable rubber composition of claim 1, where the reactive polymer is an anionically-polymerized polymer.

4. The vulcanizable rubber composition of claim 3, wherein the anionically-polymerized polymer is prepared by polymerizing conjugated diene monomer, optionally together with vinyl aromatic monomer, by employing an organolithium initiator.

5. The vulcanizable rubber composition of claim 3, where the anionically-polymerized polymer chain is a medium or low cis polydiene or polydiene copolymer.

6. The vulcanizable rubber composition of claim 5, where the anionically-polymerized polymer chain is selected from the group consisting of polybutadiene, polyisoprene, poly(styrene-co-butadiene), poly(styrene-co-butadiene-co-isoprene), poly(isoprene-co-styrene), and poly(butadiene-co-isoprene).

7. The vulcanizable rubber composition of claim 1, wherein the method further comprising drying the polymer including a phosphino- or phosphate-silane group prior to adding the polymer including a phosphino- or phosphato-silane group to a vulcanizable rubber composition.

8. The vulcanizable rubber composition of claim 1, wherein the method further comprising isolating the polymer including a phosphino- or phosphate-silane group prior to adding the polymer including a phosphino- or phosphato-silane group to a vulcanizable rubber composition.

9. The vulcanizable rubber composition of claim 8, wherein the method further comprising vulcanizing the vulcanizable rubber composition.

10. The vulcanizable rubber composition of claim 1, wherein the method further comprising quenching the polymer including a phosphino- or phosphato-silane group prior to adding the polymer including a phosphino- or phosphato-silane group to a vulcanizable rubber composition.

11. The vulcanizable rubber composition of claim 1, wherein the method comprising the polymer including a phosphino- or phosphato-silane group not being reacted with a co-functionalizing reagent.

12. The vulcanizable rubber composition of claim 1, wherein step (ii) occurring in a solvent, whereupon after reaction the polymer including a phosphino- or phosphate-silane group is isolated and removed from the solvent by filtration or drying.

13. The vulcanizable rubber composition of claim 1, wherein the phosphorus-containing group of the alkoxysilane of step (ii) containing PO.

14. The vulcanizable rubber composition of claim 13, wherein the phosphorus-containing group further having an alkoxy bonded to the P of the P=O.

15. The vulcanizable rubber composition of claim 1, wherein the phosphorus-containing group of the alkoxysilane of step (ii) being a phosphine or protected phosphine selected from a group consisting of 2-(dicyclohexylphosphinoethyl)triethoxysilane, 2-(dicyclohexylphosphinoethyl)methyldiethoxysilane, 3-(dicyclohexylphosphinoethyl)triethoxysilane, and 3-(dicyclohexylphosphinoethyl)methyldiethoxysilane.

16. The vulcanizable rubber composition of claim 1, wherein the alkoxysilane having a phosphorous-containing group of step (ii) having at least two alkoxy groups bonded to Si.

17. The vulcanizable rubber composition of claim 1, wherein the alkoxysilane having a phosphorous-containing group of step (ii) being selected from the group consisting of 2-(dicyclohexylphosphinoethyl)triethoxysilane, 2-(dicyclohexylphosphinoethyl)methyldiethoxysilane, 3-(dicyclohexylphosphinoethyl)triethoxysilane, 3-(dicyclohexylphosphinoethyl)methyldiethoxysilane, (2-diethylphosphatoethyl)methyldiethoxysilane, (2-dimethylphosphatoethyl)methyldiethoxysilane, (2-diphenylphosphatoethyl)methyldiethoxysilane, (2-dicyclophosphatoethyl)methyldiethoxysilane, (3-diethylphosphatoethyl)methyldiethoxysilane, (3-dimethylphosphatoethyl)methyldiethoxysilane, (3-diphenylphosphatoethyl)methyldiethoxysilane, (3-dicyclophosphatoethyl)methyldiethoxysilane, (2-diethylphosphatoethyl)triethoxysilane, (2-dimethylphosphatoethyl)triethoxysilane, (2-diproylphosphatoethyl)triethoxysilane, (2-dicyclophosphatoethyl)triethoxysilane, (3-diethylphosphatoethyl)triethoxysilane, (3-dimethylphosphatoethyl)triethoxysilane, (3-dipropylphosphatoethyl)triethoxysilane, and (3-dicyclophosphatoethyl)triethoxysilane.

18. A tire component comprising the vulcanizable rubber composition of claim 1.

19. A tire comprising at least one vulcanized rubber composition of claim 1 and a filler, where the at least one vulcanized rubber composition comprises a vulcanization product of a functionalized polymer.

* * * * *